United States Patent
Wycech

(10) Patent No.: US 6,276,105 B1
(45) Date of Patent: Aug. 21, 2001

(54) LAMINATE REINFORCED BEAM WITH TAPERED POLYMER LAYER

(75) Inventor: Joseph S. Wycech, Grosse Pointe Woods, MI (US)

(73) Assignee: Henkel Corporation, Gulph Mills, PA (US)

( * ) Notice: Subject to any disclaimer, the term of this patent is extended or adjusted under 35 U.S.C. 154(b) by 0 days.

(21) Appl. No.: 09/228,490

(22) Filed: Jan. 11, 1999

(51) Int. Cl.$^7$ .................................................. E04C 3/00
(52) U.S. Cl. ............... 52/309.8; 52/731.7; 52/735.1; 293/120; 296/188
(58) Field of Search ................... 296/146.6, 188, 296/189; 293/120, 122; 52/309.8, 731.1, 731.7, 735.1, 738.1

(56) References Cited

U.S. PATENT DOCUMENTS

| | | |
|---|---|---|
| 3,123,170 | 3/1964 | Bryant . |
| 3,493,257 * | 2/1970 | Fitzgerald et al. ................. 293/120 |
| 3,538,663 * | 11/1970 | MacLeod ..................... 52/738.1 X |
| 4,019,301 | 4/1977 | Fox . |
| 4,238,540 | 12/1980 | Yates et al. . |
| 4,751,249 | 6/1988 | Wycech ................................. 521/54 |
| 4,836,516 | 6/1989 | Wycech . |
| 4,853,270 | 8/1989 | Wycech ................................. 428/68 |
| 4,861,097 | 8/1989 | Wycech ............................... 296/188 |
| 4,923,902 | 5/1990 | Wycech ................................. 521/54 |
| 4,978,562 | 12/1990 | Wycech ............................. 428/35.8 |
| 5,124,186 | 6/1992 | Wycech ............................. 428/35.8 |
| 5,575,526 | 11/1996 | Wycech ............................... 296/205 |
| 5,755,486 | 5/1998 | Wycech ............................... 296/188 |
| 5,766,719 | 6/1998 | Rimkus . |
| 5,884,960 | 3/1999 | Wycech . |
| 5,888,600 | 3/1999 | Wycech ............................. 428/35.9 |

FOREIGN PATENT DOCUMENTS

| | | | |
|---|---|---|---|
| 0 891 918 A1 | 1/1999 | (EP) . | |
| 47615 * | 2/1989 | (JP) | ..................... 296/188 |
| 03118179 | 12/1991 | (JP) . | |
| 7-031569 * | 6/1995 | (JP) . | |
| WO97/43501 | 11/1997 | (WO) . | |

* cited by examiner

Primary Examiner—Carl D. Friedman
Assistant Examiner—Kevin D. Wilkens
(74) Attorney, Agent, or Firm—Wayne C. Jaeschke; Stephen D. Harper; Harold Pezzner

(57) ABSTRACT

A laminate reinforced beam assembly includes a beam having a channel shape defined by spaced side walls. The beam has a contact location where it would be subjected to a point loaded force. A reinforcement layer is provided on each of the side walls. The reinforcement layer is made of a polymer which forms a structural foam in its cured condition and which has a shape wherein its side edges taper toward each other in a direction away from the contact location.

2 Claims, 2 Drawing Sheets

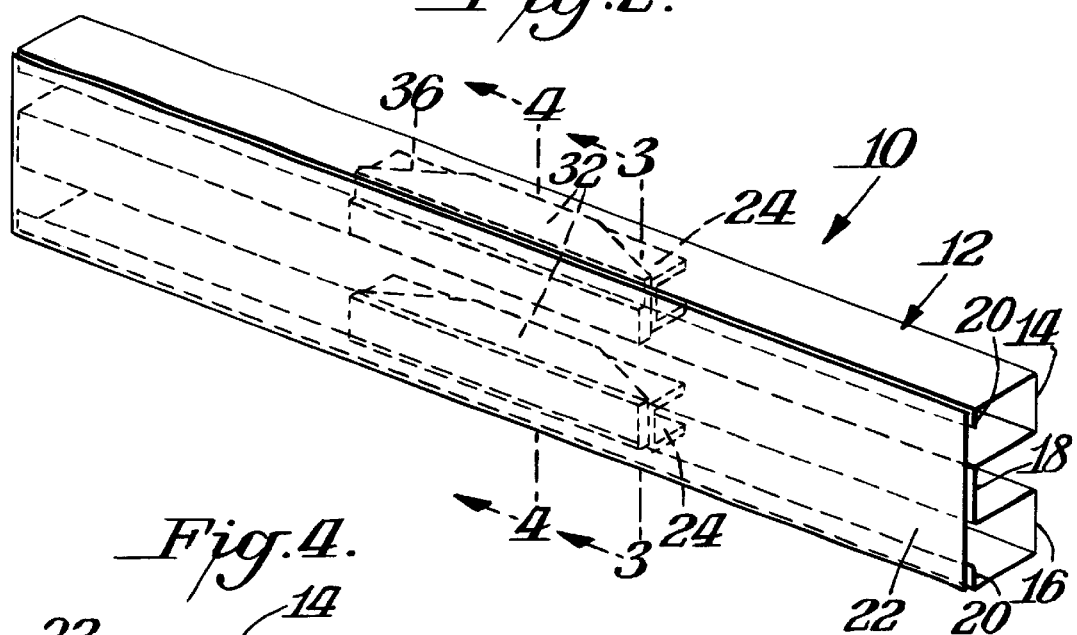
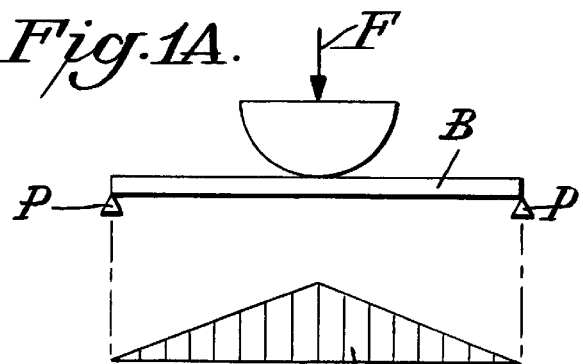
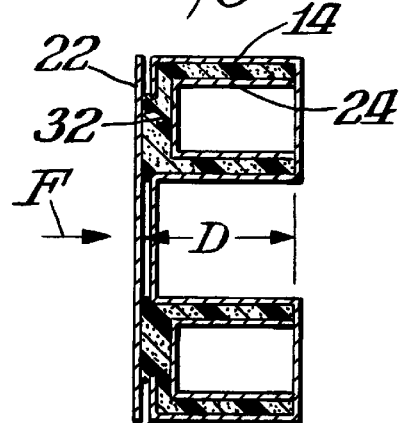
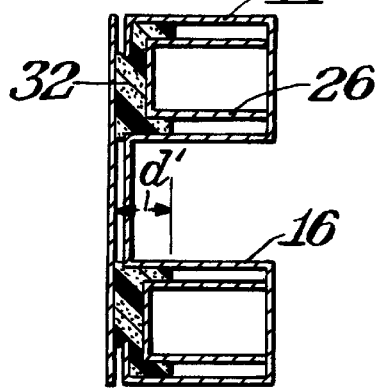

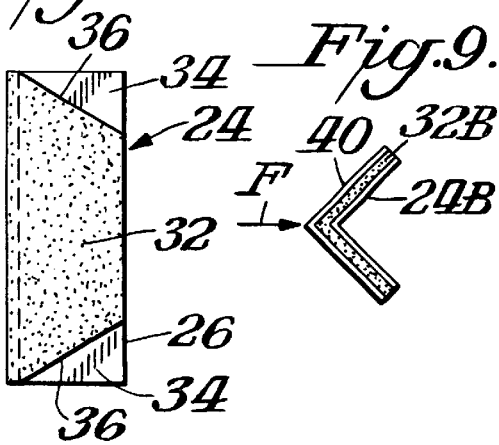
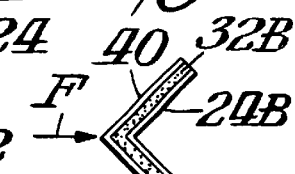
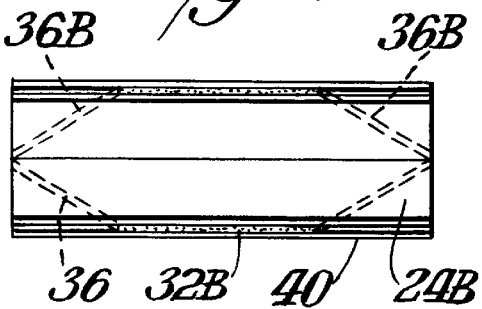
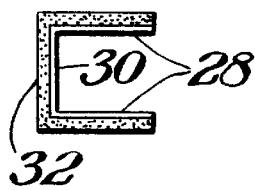
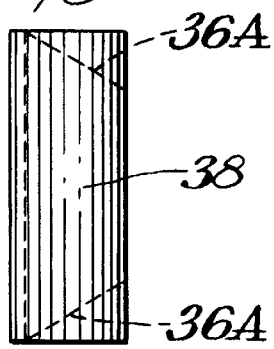

LAMINATE REINFORCED BEAM WITH TAPERED POLYMER LAYER

BACKGROUND OF THE INVENTION

Various structural members such as beams are subjected to point loaded forces. Examples of such members are a center reinforcement for a door beam or an automotive or vehicle bumper or similar beam. In order to maximize the load requirements it is desirable to reinforce such beams. It is also desirable to minimize the weight requirements and resultant costs without sacrifice to performance.

SUMMARY OF THE INVENTION

An object of this invention is to provide a center laminate reinforcement for a structural beam.

A further object of this invention is to provide techniques for reinforcing beams by optimizing the reinforcement materials.

In accordance with this invention techniques are provided which are particularly adaptable to structural members in the form of elongated beams which might be subjected to being point loaded and thus having a bending moment diagram that is triangular or generally parabolic in shape. Such beam is provided with a reinforcement layer made of a polymer material which forms a structural foam in its cured condition. A characteristic of the polymer layer is that its edges are tapered toward each other in a direction away from the location of the point loading.

In a preferred practice of this invention the polymer layer is initially coated on a carrier which is then inserted as a drop in insert between spaced side walls of the channel shaped beam. Upon curing the polymer layer becomes intimately bonded to both the carrier and the side walls of the beam.

The beams could be of various cross-sectional shapes such as U-shape, C-shape, angle-shape, L-shape and could be single or multi-celled.

THE DRAWINGS

FIGS. 1A and 1B are schematic showings of a bending moment diagram which is taken into account in the practice of this invention;

FIG. 2 is a perspective view of a vehicle beam reinforced in accordance with this invention;

FIGS. 3 and 4 are cross-sectional views taken through FIG. 2 along the lines 3—3 and 4—4, respectively;

FIG. 5 is a top plan view of a carrier having a polymer layer to function as a drop in insert for use in the practice of the invention shown in FIGS. 2–4;

FIG. 6 is an end elevational view of the insert shown in FIG. 5;

FIG. 7 is a top plan view of a reinforced beam assembly having a C-shape in accordance with an alternative form of this invention;

FIG. 8 is an end elevational view of the assembly shown in FIG. 7;

FIG. 9 is an end elevational view similar to FIG. 8 of yet another practice of this invention; and FIG. 10 is a front elevational view of the assembly shown in FIG. 9.

DETAILED DESCRIPTION

The present invention is based upon the recognition that certain structural members such as beams and more particularly various vehicle beams are subjected to forces that are point loaded thereby resulting in a triangularly-shaped bending moment diagram. FIGS. 1A and 1B, for example show such a bending moment diagram. As indicated therein the force F is applied to the center point of a beam B held at its ends by support points P,P. In accordance with the relationship $$m = \frac{PL}{4},$$

a bending moment diagram D results which is generally triangularly-shaped having its greatest distance directly in line with force F and having its smallest distances at each end in line with the support points P,P.

The present invention takes into account that in circumstances where there is a generally triangular bending moment or a bending moment that is, for example, parabolic due to a center point distributed load, it is only necessary to provide a reinforcement polymer layer which is of a shape corresponding to the bending moment diagram. As a result, there is a cost savings and weight savings in the amount of polymer material used for the reinforcement layer without sacrifice to its effectiveness. Thus, the invention is practiced by having an amount of polymer in a pattern and location where the distribution is lessened away from the center point of the beam or the point of loading. In the preferred practice of this invention the polymer layer is initially applied to a carrier to result in a drop in insert. Preferably, the carrier for the polymer is a constant section over the length of the beam to be reinforced and would generally be from about ⅙ to ⅓ the span. If desired, however, the carrier may more closely conform to the shape of the polymer layer and thus could have sides which are also generally triangular. (The term "generally triangular" is intended to include triangular and trapezoidal shapes.) As noted, however, the preferred practice of the invention uses a carrier which has a surface larger than the area covered by the polymer.

The concepts of the invention may be used for reinforcing beams of various cross-sectional shapes. In general, the beam would have a channel shape defined by side walls. Thus, the beam could have a cross-sectional shape which is U-shaped, C-shaped, V-shaped or which is an angle or an L and which is multi-celled or of a single cell. The various figures illustrate practices of the invention.

FIG. 2 shows a laminate reinforced beam assembly 10 in accordance with one practice of the invention. As shown therein, the beam comprises a metal structural member 12 which is formed by a pair of spaced U sections 14,16 interconnected by wall 18 with the ends of each section terminating in an inwardly directed flange 20. A compression cap 22 is mounted over the open ends of the channels of sections 14,16.

The beam 12 may be used for various purposes. In one practice of the invention the beam may be a center laminate reinforcement for a vehicle door beam or an automotive bumper or similar vehicle beam.

As illustrated, a drop in insert 24 is provided for each U-shaped section 14,16. FIGS. 5–6 illustrate a suitable drop in insert. As shown therein insert 24 comprises an inner carrier 26 which is made of a shape generally conforming to the U-shape of each beam section 14,16. Thus, carrier 26 has a pair of side walls 28 interconnected by an end wall 30. A layer of reinforcement polymer 32 is provided on the outer surface of walls 28,30. As illustrated in FIGS. 5–6 and in FIG. 2, as well as FIGS. 3–4, the polymer 32 covers generally the entire outer surface of interconnecting wall 30, but is placed on side walls 28 in a generally triangular or trapezoidal pattern leaving the corners 34 of carrier 26 exposed or free of polymer material. The polymer coated carrier which forms the drop in insert 24 is then placed in each U-shaped cell or channel 14,16 with the end wall 30 located at the open end of each U-shaped section 14,16. Drop in insert 24 is located so that its center point would be at a location of the point of loading indicated by the arrow F. By having the side edges 36,36 of the polymer layer tapered toward each other in a direction away from the location of the center load, the full depth D of the polymer layer is utilized as reinforcement at the center point location. Laterally outwardly from the center point location (as indicated, for example, in FIG. 3 by the distance $d^1$) there is a lesser amount of reinforcement polymer at those locations where there is not as great a need for reinforcement.

The reinforcement layer 32 is preferably a polymer material which forms a structural foam upon curing to provide rigid reinforcement for the beam. When cured the structural foam is intimately adhered not only to its carrier 24, but also to the other structural members that it contacts such as the side walls of channel sections 14,16, flanges 20 and the inner surface of compression cap 22. See FIGS. 3–4. Where the structural foam is expandable, carrier 26 is dimensioned to allow sufficient spacing from the side walls of the beam so as to accommodate the expanded foam material. A preferred polymer foam is a heat expandable foam, such as described in U.S. Pat. No. 4,737,407 and U.S. Pat. No. 4,751,249. The advantage of a heat expandable foam in connection with a vehicle beam is that the foam would expand when the portion of the vehicle which includes the beam 12 would be subjected to heat such as by the conventional coating processes used in vehicle manufacture. Thus, a separate heating step is not needed to activate the foam.

While a heat expandable foam is preferred, the invention may be practiced with other types of foams which are, for example, chemically activated. Thus, any suitable foam material such as a thermoset and/or expandable resin based foam may be used in the practice of this invention.

FIGS. 2–4 illustrate the practice of the invention wherein the beam 12 is a multi-cell beam having a plurality of U-shaped sections 14,16. It is to be understood, however, that the invention may be practiced with beams of other shapes. FIGS. 7–8, for example, illustrate a beam 38 having its spaced walls form a C-shaped channel. The carrier 24A would have a corresponding shape and be spaced from beam 38 to accommodate the foam 32A. As shown in FIG. 7 the side edges 36A of the foam are tapered toward each other in a direction away from the location of force F.

The cross-sectional shape of the beam could alternatively be of other configurations such as a V-shape or an L-shape or some form of angle shape. FIGS. 9–10, for example, illustrate a beam 40 to have an angle shape with the carrier 24B having a corresponding shape and spacing from beam 40 to accommodate the polymer layer 32B. As shown in FIG. 10 the side edges 36B of the polymer layer 32B would be tapered in a direction away from the location of force F.

Where the carrier for beams which are not U-shaped such as C-shaped or angle shaped, the connecting portion similar to intermediate wall 30 would be centrally located between the outer spaced walls of the carrier.

In the preferred practice of the invention the carrier is dimensioned so that it readily functions as a drop in insert by having its shape and dimensions generally conform to the channel shape in which the insert is placed. This simplifies assembly of the components. It is to be understood, however, that the invention could be broadly practiced by completely omitting a carrier and by providing the polymer layer directly on the inner surfaces of the beam itself. Such alternatives, however, is not as preferred as is the practice of using a drop in insert. Preferably, the carrier for the drop in insert would be manufactured so as to be of constant or uniformed dimension rather than being shaped to conform to the precise size and shape of the polymer layer. If desired, however, the carrier itself may have the same shape as a polymer layer whereupon, for example, the exposed portions 34 shown in FIG. 5 would not be present.

As illustrated in FIG. 2 the beam 12 may be, for example, about 60 inches long and have an overall height of about 6 inches. The carrier 24 and its foam layer 32 would be centrally located and would cover from about ⅙ th to ⅓ rd of the beam length.

Carrier 26 may be made of any suitable material and preferably is made of a rigid material which in itself also assists in the reinforcement. Within the broad practice of the invention, however, the carrier need not be rigid as long as it serves its function of providing a support for the preshaped polymer layer 32 to enable placement of the polymer layer at the desired location with respect to the beam. Preferably, however, carrier 26 is made of a suitable metal, although it could also be made of other materials which are rigid or become rigid upon curing or further treatment. Thus, the carrier could be made of various plastic or polymeric materials or various wood type fibrous materials having sufficient rigidity to function as a support for the polymer layer 32. Where a heat expandable foam is used the support should be able to withstand the heat encountered during the heat curing. Where other types of foam materials are used, however, it is not necessary that the support or carrier be able to withstand high temperatures. Instead the basic requirement for the carrier is that it has sufficient rigidity to function in its intended manner. It is also possible to use as the carrier, materials which become rigid upon curing or further treatment. Where the invention is used with a beam made of metal and a carrier made of metal the cured foam is intimately bonded to both materials. The invention, however, may be used with beams made of materials other than metal which would still result in a sufficient bonding of the cured foam to the beam. Where the foam is an expandable foam it is preferred that the materials selected for the beam and the carrier, as well as the foam, should be such that the thin unexpanded foam upon expansion forms a strong bond with the beam and carrier so that a structural laminate will result.

While the invention has particular utility in the automotive field it is to be understood that the invention may be practiced in other fields where it is necessary to reinforce a beam, particularly a beam which is subject to being point loaded resulting in bending moment diagrams having a center point distributed load.

What is claimed is:

1. A drop in insert for reinforcing a beam comprising a carrier, said carrier having spaced walls with an outer surface, a connecting portion interconnecting said spaced walls, said connecting portion having an outer surface joined to said outer surfaces of said spaced walls, a polymer layer on said outer surface of said spaced walls and said connecting portion, said polymer layer being made of a material which forms a structural foam in its cured condition and becomes intimately bonded to the beam and to said outer surface, said polymer layer having side edges which taper toward each other in a direction away from said connecting portion, said insert has a rounded C-shaped cross section, and said connecting portion bisecting said carrier and merging into said spaced walls.

2. A drop in insert for reinforcing a beam comprising a carrier, said carrier having spaced walls with an outer surface, a connecting portion interconnecting said spaced walls, said connecting portion having an outer surface joined to said outer surfaces of said spaced walls, a polymer layer on said outer surface of said spaced walls and said connecting portion, said polymer layer being made of a material which forms a structural foam in its cured condition and becomes intimately bonded to the beam and to said outer surface, said polymer layer having side edges which taper toward each other in a direction away from said connecting portion, said insert has an angle shaped cross section, and said connecting portion bisecting said carrier and merging into said spaced walls into said spaced walls.

* * * * *

UNITED STATES PATENT AND TRADEMARK OFFICE
CERTIFICATE OF CORRECTION

PATENT NO. : 6,276,105 B1
DATED : August 21, 2001
INVENTOR(S) : Wycech

It is certified that error appears in the above-identified patent and that said Letters Patent is hereby corrected as shown below:

Column 6,
Line 6, after the first occurrence of "walls", delete "into said spaced walls".

Signed and Sealed this

Tenth Day of June, 2003

JAMES E. ROGAN
*Director of the United States Patent and Trademark Office*